US012389112B1

(12) United States Patent
Vempeny et al.

(10) Patent No.: US 12,389,112 B1
(45) Date of Patent: Aug. 12, 2025

(54) SYSTEMS AND METHODS FOR CHANGING IMAGE CAPTURE DEVICE OPERATION

(71) Applicant: GoPro, Inc., San Mateo, CA (US)

(72) Inventors: Sheen Jose Vempeny, Sioux City, IA (US); Kevin Marcus Grant, Phoenix, AZ (US)

(73) Assignee: GoPro, Inc., San Mateo, CA (US)

( * ) Notice: Subject to any disclaimer, the term of this patent is extended or adjusted under 35 U.S.C. 154(b) by 185 days.

(21) Appl. No.: 18/340,745

(22) Filed: Jun. 23, 2023

(51) Int. Cl.
*H04N 23/661* (2023.01)
*H04N 23/60* (2023.01)

(52) U.S. Cl.
CPC ........... *H04N 23/661* (2023.01); *H04N 23/64* (2023.01)

(58) Field of Classification Search
CPC .............................. H04N 23/661; H04N 23/64
USPC ..................................................... 348/222.1
See application file for complete search history.

(56) References Cited

U.S. PATENT DOCUMENTS

| | | | |
|---|---|---|---|
| 9,344,615 B1* | 5/2016 | Bostick | H04N 23/62 |
| 9,471,059 B1* | 10/2016 | Wilkins | G05D 1/0016 |
| 9,497,376 B2* | 11/2016 | Bostick | G06K 7/1417 |
| 9,571,713 B2* | 2/2017 | Basson | H04N 23/661 |
| 9,712,737 B2* | 7/2017 | Yamashita | H04N 1/32144 |
| 9,898,884 B1* | 2/2018 | Arora | G06Q 30/0226 |
| 10,152,665 B2* | 12/2018 | Ardö | H04W 4/025 |
| 10,373,035 B2* | 8/2019 | Skans | G06K 7/1095 |
| 10,475,315 B2* | 11/2019 | Madar | G08B 13/196 |
| 10,861,276 B1* | 12/2020 | Arora | G07F 9/002 |
| 11,496,685 B2* | 11/2022 | Koreki | H04N 23/63 |
| 11,961,373 B2* | 4/2024 | Shturma | G06Q 20/208 |
| 2004/0205512 A1* | 10/2004 | Hoover | G06F 40/137 715/201 |
| 2014/0211018 A1* | 7/2014 | de Lima | H04N 7/181 348/159 |
| 2015/0047024 A1* | 2/2015 | Park | G06Q 30/0645 726/19 |
| 2015/0116520 A1* | 4/2015 | Baym | H04N 5/44 348/211.2 |
| 2016/0295092 A1* | 10/2016 | Yamashita | H04N 23/66 |
| 2016/0343137 A1* | 11/2016 | Skans | H04W 4/025 |
| 2017/0323187 A1* | 11/2017 | Ardö | G06K 7/1095 |
| 2017/0324893 A1* | 11/2017 | Matsuda | H04N 23/80 |
| 2019/0149714 A1* | 5/2019 | Yuan | G08B 13/19682 348/143 |
| 2021/0067700 A1* | 3/2021 | Koreki | H04N 23/64 |
| 2022/0012975 A1* | 1/2022 | Shturma | G06Q 20/3276 |
| 2023/0062187 A1* | 3/2023 | Holland | G06V 20/35 |
| 2024/0054196 A1* | 2/2024 | Nainar | H04W 12/33 |
| 2024/0265367 A1* | 8/2024 | Nummela | G06Q 20/20 |

\* cited by examiner

*Primary Examiner* — Pritham D Prabhakher
(74) *Attorney, Agent, or Firm* — Esplin & Associates, PC

(57) ABSTRACT

An image capture device sends out transmission to enable a computing device to determine when the image capture device is near the computing device. When the computing device receives the transmission from the image capture device, the computing device uses the transmission to determine the proximity of the image capture device to the computing device. When the image capture device is near the computing device (e.g., within communication range, within a threshold distance), the computing device visually and/or wirelessly facilitates change in operation of the image capture device. For example, the computing device visually and/or wirelessly facilitates change in capture mode and/or capture setting of the image capture device.

20 Claims, 7 Drawing Sheets

SYSTEMS AND METHODS FOR CHANGING IMAGE CAPTURE DEVICE OPERATION

FIELD

This disclosure relates to facilitating changes in operations of an image capture device based on proximity of the image capture device.

BACKGROUND

A user may wish to change the settings of an image capture device. Manually changing the settings of the image capture device may be difficult and/or time consuming. Facilitating a user to easily change settings of the image capture device may encourage the use of the image capture device by the user.

SUMMARY

This disclosure relates to changing image capture device operation. A receiver may receive transmission from an image capture device. Proximity of the image capture device to the receiver may be determined based on the transmission received from the image capture device and/or other information. A change in operation of the image capture device may be facilitated based on the proximity of the image capture device to the receiver and/or other information.

A system for changing image capture device operation may include one or more electronic storage, a receiver, processor, and/or other components. In some implementations, the system may further include an electronic display. In some implementations, the system may further include a transmitter.

The electronic storage may store information relating to an image capture device, information relating to operations of the image capture device, information relating to changes in operations of the image capture device, information relating to machine-readable optical codes, information relating to signals, and/or other information.

The receiver configured to receive transmission from an image capture device. The electronic display may be configured to present one or more machine-readable optical codes. The transmitter may be configured to transmit one or more signals to the image capture device.

The processor(s) may be configured by machine-readable instructions. Executing the machine-readable instructions may cause the processor(s) to facilitate changing image capture device operation. The machine-readable instructions may include one or more computer program components. The computer program components may include one or more of a proximity component, an operation change component, and/or other computer program components.

The proximity component may be configured to determine proximity of an image capture device to the receiver. The proximity of the image capture device to the receiver may be determined based on the transmission received from the image capture device and/or other information.

The operation change component may be configured to facilitate one or more changes in operation of the image capture device based on the proximity of the image capture device to the receiver and/or other information. In some implementations, the change(s) in the operation of the image capture device may be facilitated based on the proximity of the image capture device to the receiver satisfying a proximity criterion and/or other information.

In some implementations, the change(s) in the operation of the image capture device may include a change in a capture setting of the image capture device. In some implementations, the change(s) in the operation of the image capture device may include a change in a capture mode of the image capture device. In some implementations, the change(s) in the operation of the image capture device may be determined based on time, location, activity, and/or other information.

In some implementations, facilitating the change(s) in the operation of the image capture device may include generating a machine-readable optical code and presenting the machine-readable optical code on the electronic display. The machine-readable optical code may convey one or more aspects of the operation of the image capture device. The presentation of the machine-readable optical code on the electronic display may enable the image capture device to capture an image including the machine-readable optical code, determine the aspect(s) of operation conveyed by the machine-readable optical code, and operate in accordance with the aspect(s) of operation conveyed by the machine-readable optical code. In some implementations, the machine-readable optical code includes a QR code.

In some implementations, facilitating the change(s) in the operation of the image capture device may include generating a signal and transmitting, via the transmitter, the signal to the image capture device. The signal may convey one or more aspects of the operation of the image capture device. The transmission of the signal to the image capture device may enable the image capture device to receive the signal, determine the aspect(s) of operation conveyed by the signal, and operate in accordance with the aspect(s) of operation conveyed by the signal. In some implementations, the signal may include a Bluetooth Low Energy signal.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
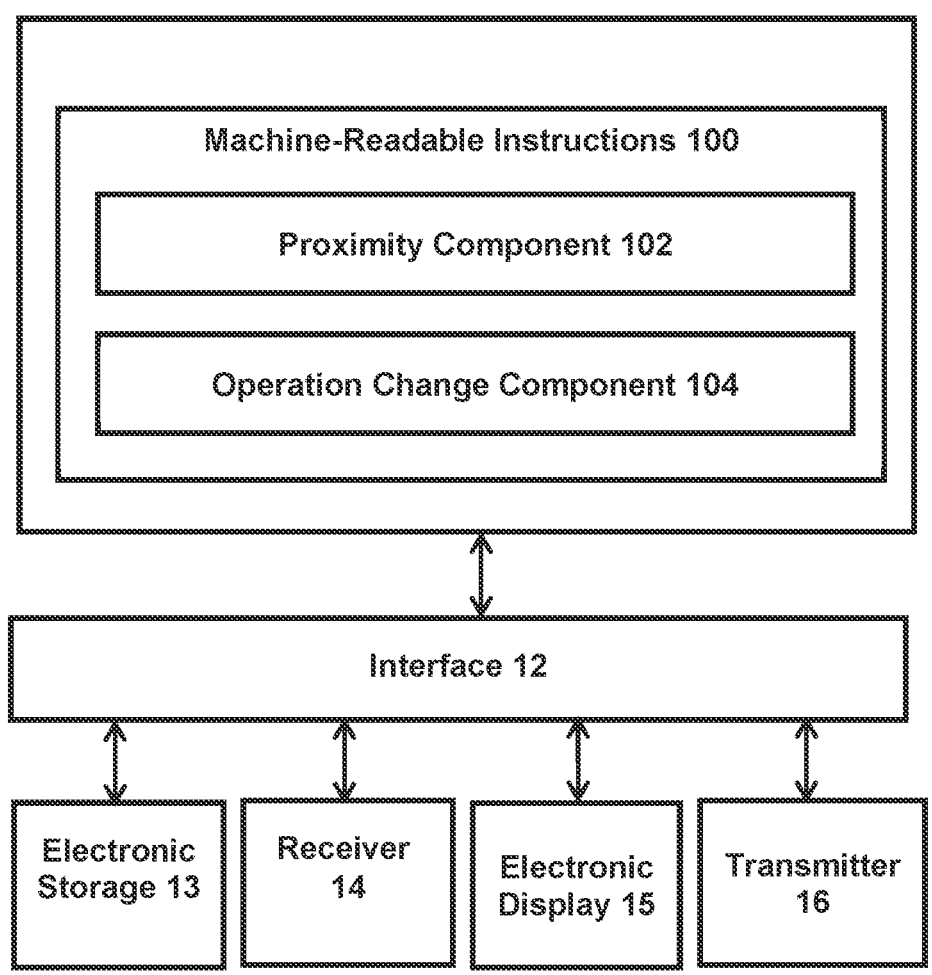
FIG. 1 illustrates a system for changing image capture device operation.

FIG. 1 illustrates system 10 for changing image capture device operation. The system 10 may include one or more of a processor 11, an interface 12 (e.g., bus, wireless interface), an electronic storage 13, a receiver 14, an electronic display 15, a transmitter 16, and/or other components. The system 10 may include other components not shown in FIG. 1. The system 10 may not include one or more components shown in FIG. 1. The receiver 14 may receive transmission from an image capture device. Proximity of the image capture device to the receiver 14 may be determined by the processor 11 based on the transmission received from the image capture device and/or other information. A change in operation of the image capture device may be facilitated by the processor 11 based on the proximity of the image capture device to the receiver and/or other information.

One or more components of the system 10 may be part of a computing device. The computing device may include a mobile device, a desktop device, and/or other device. A mobile device may refer to a piece of portable electronic device, such as a smartphone, a smartwatch, a tablet, an image capture device, and/or other mobile device. A desktop device may refer to a computing device in a form intended for regular use at a single location. The computing device may be freely movable to different locations. The computing device may be fixed in place at a particular location.

The electronic storage 13 may include one or more electronic storage media that electronically stores information. The electronic storage 13 may store software algorithms, information determined by processor 11, information received remotely, and/or other information that enables system 10 to function properly. For example, the electronic storage 13 may store information relating to an image capture device, information relating to operations of the image capture device, information relating to changes in operations of the image capture device, information relating to machine-readable optical codes, information relating to signals, and/or other information.

The receiver 14 may refer to equipment used to receive and/or convert electromagnetic waves carrying information. The receiver 14 may be configured to receive information via the electromagnetic waves. The receiver 14 may receive and/or convert electromagnetic waves based on one or more wireless communication technologies, such as WiFi, Bluetooth, and/or Bluetooth Low Energy.

The receiver 14 may be configured to receive transmission from one or more image capture devices. The receiver 14 may be configured to continuously receive transmission from the image capture device(s). The receiver 14 may be configured to periodically receive transmission from the image capture device(s). The receiver 14 may be configured to receive transmission from the image capture device(s) at one or more moments in time.

An image capture device may refer to a device that captures visual content. An image capture device may capture visual content in the form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet). An image capture device may capture other content, such as audio content (sound). An image capture device may capture media items. Media items may refer to items that may be visually and/or audibly consumed. Media items may refer to multimedia items. For example, media items may include images, videos, sound clips, and/or other media items.

Transmission from an image capture device may refer to something that is transmitted by the image capture device. Transmission from an image capture device may refer to electromagnetic waves transmitted by the image capture device. Transmission from an image capture device may include transmission of information directed to the receiver 14. Transmission from an image capture device may include broadcast of information that is received by the receiver 14 when the receiver 14 is within the range of the broadcast. Other types of transmission by the image capture device are contemplated.

The image capture device may transmit information relating to the image capture device. The image capture device may transmit information relating to operation of the image capture device. For example, the image capture device may transmit information on the identity of the image capture device, such as the type/model of the image capture device and/or the identifier of the image capture device, or on its current operating status/mode/settings. The image capture device may transmit information that requests one or more information and/or one or more actions from the receiver of the transmission (e.g., the system 10). For example, the image capture device may transmit requests for the system 10 to provide information on how the operation of the image capture device should be changed. the image capture device may transmit requests for the system 10 to instruct the image capture device on how the operation of the image capture device should be changed. Transmission of other types of information is contemplated.

The electronic display 15 may refer to an electronic device that provides visual presentation of information. The electronic display 15 may be a standalone device or a component of a computing device, such as a display of a mobile device or a desktop device. The electronic display 15 may be configured to present information to facilitate changes in the operation of one or more image capture devices. For example, the electronic display 14 may be configured to present one or more machine-readable optical codes. A machine-readable optical code may convey one or more aspects of the operation of an image capture device. An image capture device that captures an image include the machine-readable optical code may: determine the aspect(s) of the operation conveyed by the machine-readable optical code, and operate in accordance with the aspect(s) of the operation conveyed by the machine-readable optical code.

The transmitter 16 may refer to equipment used to generate and/or transmit electromagnetic waves carrying information. The transmitter 16 may be configured to transmit information via the electromagnetic waves. The transmitter 16 may generate and/or transmit electromagnetic waves based on one or more wireless communication technologies, such as WiFi, Bluetooth, and/or Bluetooth Low Energy.

The transmitter 16 may be configured to transmit one or more signals to one or more image capture devices. The transmitter 16 may be configured to continuously transmit signal(s) to the image capture device(s). The transmitter 16 may be configured to periodically transmit signal(s) to the image capture device(s) The transmitter 16 may be configured to transmit signal(s) to the image capture device(s) at one or more moments in time.

A signal may refer to an electromagnetic wave transmitted by the transmitter. A signal may convey information to facilitate changes in the operation of one or more image capture devices. For example, a signal may convey one or more aspects of the operation of an image capture device. An image capture device that receives the signal may: determine the aspect(s) of the operation conveyed by the signal, and operate in accordance with the aspect(s) of the operation conveyed by the signal.

The present disclosure enables operation of an image capture device to be easily changed via interaction with a computing device. The image capture device sends out transmission to enable the computing device to determine when the image capture device is near the computing device. When the computing device receives the transmission from the image capture device, the computing device uses the transmission to determine the proximity of the image capture device to the computing device. When the image capture device is near the computing device (e.g., within communication range, within a threshold distance), the computing device visually and/or wirelessly facilitates change in operation of the image capture device. For example, the computing device visually and/or wirelessly facilitates change in capture mode and/or capture setting of the image capture device.

Figure 3A:
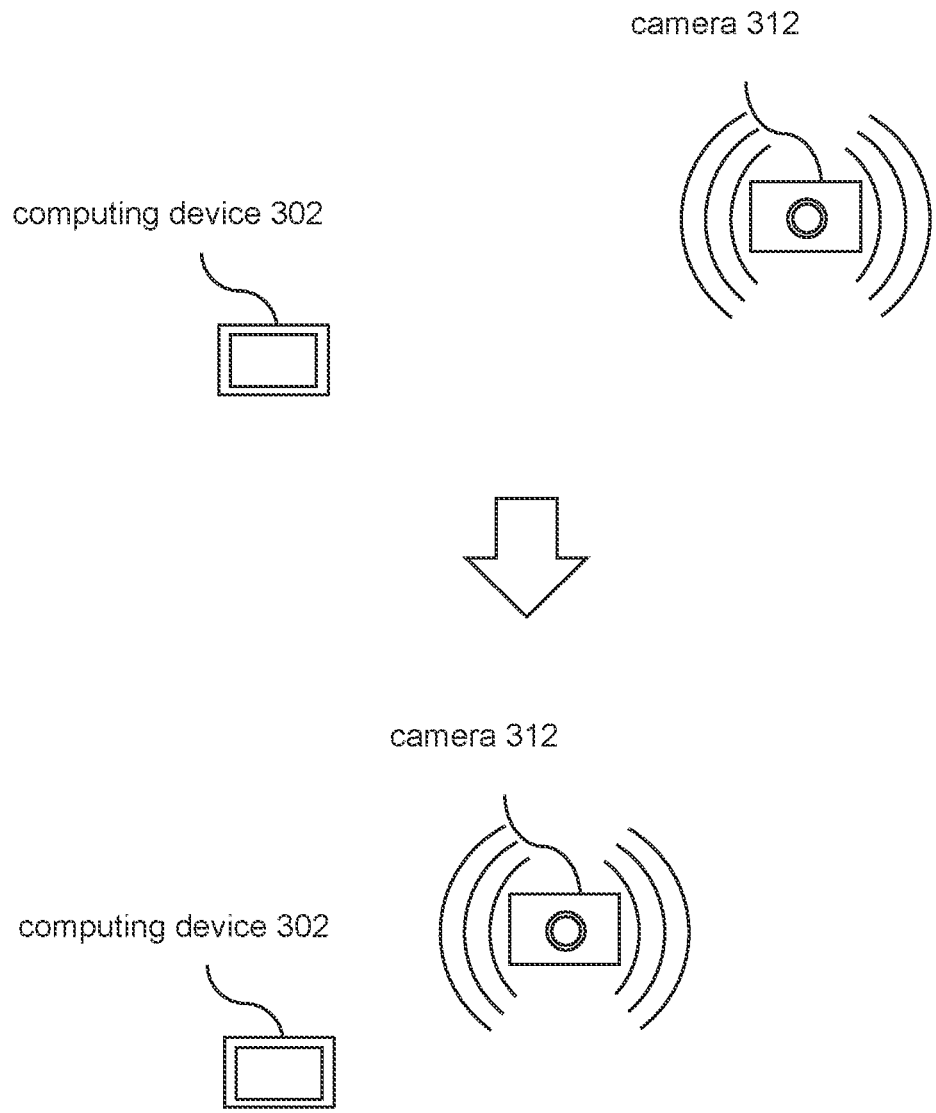
FIG. 3A illustrates an example scenario for changing image capture device operation.
Figure 3B:
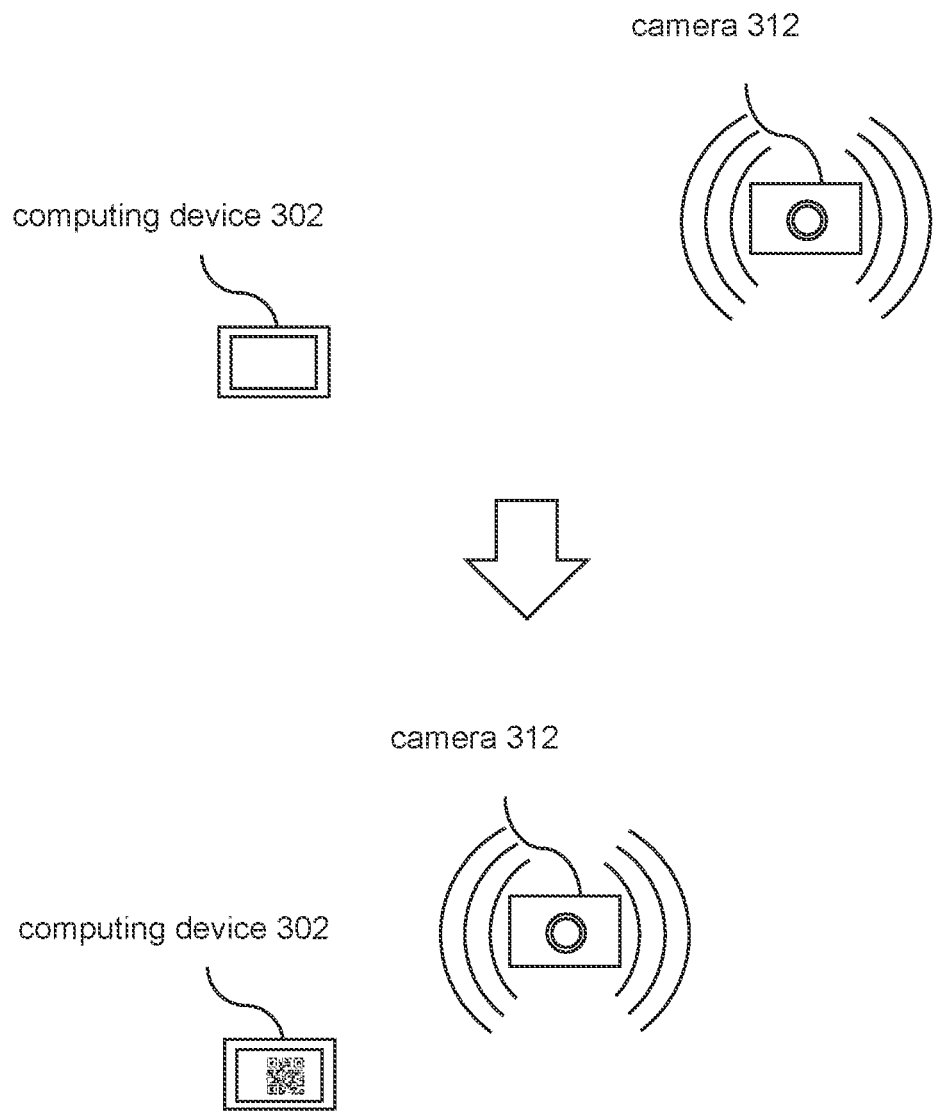
FIG. 3B illustrates an example scenario for changing image capture device operation.
Figure 3C:
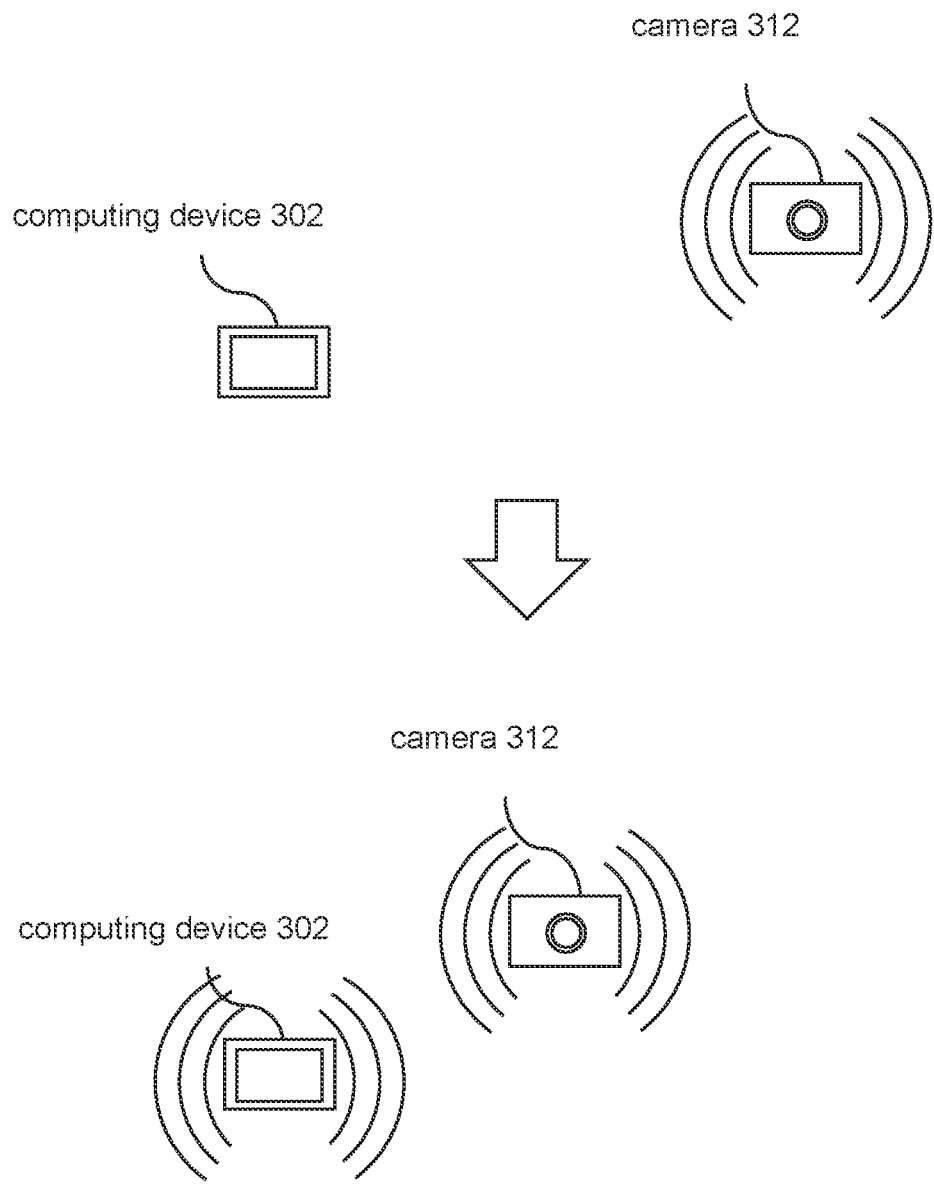
FIG. 3C illustrates an example scenario for changing image capture device operation.

FIGS. 3A, 3B, and 3C illustrate example scenarios for changing image capture device operation. A camera 312 may transmit information for reception by a computing device 302. For example, the camera 312 may transmit relating to the camera 312 and/or information relating to operation of the camera 312. The camera 312 may transmit information so that the computing device 302 can receive the transmission when the computing device 302 is within transmission range of the camera 312. For example, the camera 312 may broadcast information and enable the computing device 302 to receive the information when the computing device 302 is within a broadcast range of the camera 312. The computing device 302 may determine proximity of the camera 312 to the computing device 302 based on the transmission received from the camera 312. For example, the computing device 302 may determine that the camera 312 is near (e.g., within a threshold distance, within communication range) the computing device 302 based on reception of the transmission from the camera 312 and/or signal strength of the transmission from the camera 312. Based on the computing device 302 determining that the camera 312 is near the computing device 302, the computing device may facilitate one or more changes in the operation of the camera 312.

For example, in FIG. 3A, the camera 312 may initially be positioned far from the computing device 302. The distance between the camera 312 and the computing device 302 may result in the computing device 302 not receiving the transmission from the camera 312 or the transmission from the camera 312 being received by the computing device 302 at insufficient signal strength (e.g., signal strength being lower than a threshold signal strength). Based on non-reception of the transmission from the camera 312 or the insufficient signal strength of the transmission from the camera 312, the computing device 302 may not facilitate change(s) in the operation of the camera 312.

The positioning of the camera 312 and/or the computing device 302 may change to bring the camera 312 near the computing device 302. For example, the camera 312 and/or the computing device 302 may be moved to reduce the distance between the camera 312 and the computing device 302. The camera 312 being near the computing device 302 may include the camera 312 being within a threshold distance of the computing device 302, the camera 312 being within a certain distance to enable the computing device 302 to receive transmission from the camera 312, the camera 312 being within a certain distance to enable the computing device 302 to receive transmission from the camera 312 with certain signal strength, and/or the camera 312 otherwise being near the computing device 302. Based on physical proximity of the camera 312 to the computing device 302, the computing device 302 may facilitate change(s) in the operation of the camera 312. Based on reception of the transmission from the camera 312 or sufficient signal strength of the transmission from the camera 312, the computing device 302 may facilitate change(s) in the operation of the camera 312.

For example, referring to FIG. 3B, when the computing device 302 determines that the camera 312 is near the computing device 302 (e.g., based on receiving transmission from the camera 312, based on sufficient signal strength of transmission from the camera 312), the computing device 302 may visually facilitate change(s) in the operation of the camera 312 by generating and presenting one or more machine-readable optical codes on one or more displays. For instance, the computing device 302 may be a mobile device including a display and the machine-readable optical code(s) may be presented on the display. When the computing device 302 determines that the camera 312 is far from the computing device 302 (e.g., based on not receiving transmission from the camera 312, based on insufficient signal strength of transmission from the camera 312), the computing device 302 may stop presenting the machine-readable optical code(s) may be presented on the display. Information presented on the display may dynamically change based on proximity of the camera 312 to the computing device 302 (e.g., the machine-readable optical code(s) appearing on the display when the camera 312 is brought near the computing device 302, the machine-readable optical code(s) disappearing from the display when the camera 312 is taken away from the computing device 302).

The machine-readable optical code(s) may convey one or more aspects of operation of the camera 312 (and/or other cameras). The presentation of the machine-readable optical code(s) on the display may enable the camera 312 to capture one or more images including the machine-readable optical code(s). The camera 312 may capture image(s) that depict the machine-readable optical code(s). The camera 312 may use the information conveyed by the machine-readable optical code(s) to change its operation. The camera 312 may determine the aspect(s) of the operation conveyed by the machine-readable optical code(s), and operate in accordance with the aspect(s) of the operation conveyed by the machine-readable optical code(s).

Such presentation of machine-readable optical code(s) based on proximity of the camera 312 may facilitate change(s) in the operation of the camera 312. Simply by bringing the camera 312 near the computing device 302, the camera 312 may be presented with the machine-readable optical code(s) that enable change(s) in the operation of the camera 312.

The camera 312 may automatically change its operation to operate in accordance with the aspect(s) of the operation conveyed by the machine-readable optical code(s). For example, the machine-readable optical code(s) may convey particular capture setting(s) and/or capture mode for the camera 312, and the camera 312 may automatically change its capture setting(s) and/or capture mode to operate with the capture setting(s) and/or in the capture mode conveyed by the machine-readable optical code(s).

The camera 312 may require user confirmation before changing its operation to operate in accordance with the aspect(s) of the operation conveyed by the machine-readable optical code(s). For example, the machine-readable optical code(s) may convey particular capture setting(s) and/or capture mode for the camera 312, and the camera 312 may prompt its user to confirm that its capture setting(s) and/or capture mode should be changed (e.g., via interaction with an option presented on a touchscreen display of the camera 312, via interaction with a physical button of the camera 312). Based on the user confirming that its capture setting(s) and/or capture mode should be changed, the camera 312 may then change its capture setting(s) and/or capture mode to operate with the capture setting(s) and/or in the capture mode conveyed by the machine-readable optical code(s).

As another example, referring to FIG. 3C, when the computing device 302 determines that the camera 312 is near the computing device 302 (e.g., based on receiving transmission from the camera 312, based on sufficient signal strength of transmission from the camera 312), the computing device 302 may wirelessly facilitate change(s) in the operation of the camera 312 by generating and transmitting one or more signals to the camera 312. The signal(s) may be directed to the camera 312 and/or broadcast for reception by any camera in the area. When the computing device 302 determines that the camera 312 is far from the computing device 302 (e.g., based on not receiving transmission from the camera 312, based on insufficient signal strength of transmission from the camera 312), the computing device 302 may stop transmitting the signal(s) to the camera 312. Transmission of information by the computing device 302 may dynamically change based on proximity of the camera 312 to the computing device 302 (e.g., the signal(s) being transmitted when the camera 312 is brought near the computing device 302, the signal(s) not being transmitted when the camera 312 is taken away from the computing device 302).

The signal(s) may convey one or more aspects of operation of the camera 312 (and/or other cameras). The transmission of the signal(s) may enable the camera to receive the signal(s). The camera 312 may use the information conveyed by the signal(s) to change its operation. The camera 312 may determine the aspect(s) of the operation conveyed by the signal(s), and operate in accordance with the aspect(s) of the operation conveyed by the signal(s).

Such transmission of information based on proximity of the camera 312 may facilitate change(s) in the operation of the camera 312. Simply by bringing the camera 312 near the computing device 302, the camera 312 may receive signal(s)/information that enable change(s) in the operation of the camera 312.

The camera 312 may automatically change its operation to operate in accordance with the aspect(s) of the operation conveyed by the signal(s). For example, the signal(s) may convey particular capture setting(s) and/or capture mode for the camera 312, and the camera 312 may automatically change its capture setting(s) and/or capture mode to operate with the capture setting(s) and/or in the capture mode conveyed by the signal(s).

The camera 312 may require user confirmation before changing its operation to operate in accordance with the aspect(s) of the operation conveyed by the signal(s). For example, the signal(s) may convey particular capture setting(s) and/or capture mode for the camera 312, and the camera 312 may prompt its user to confirm that its capture setting(s) and/or capture mode should be changed (e.g., via interaction with an option presented on a touchscreen display of the camera 312, via interaction with a physical button of the camera 312). Based on the user confirming that its capture setting(s) and/or capture mode should be changed, the camera 312 may then change its capture setting(s) and/or capture mode to operate with the capture setting(s) and/or in the capture mode conveyed by the signal(s).

The processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100 to facilitate changing image capture device operation. Machine readable instructions 100 may include one or more computer program components. Machine readable instructions 100 may include one or more of a proximity component 102, an operation change component 104, and/or other computer program components.

The proximity component 102 may be configured to determine proximity of an image capture device to the receiver 14. Determining the proximity of the image capture device to the receiver 14 may include determining the proximity of the image capture device to the system 10. Determining the proximity of the image capture device to the receiver 14 may include ascertaining, approximating, calculating, establishing, estimating, finding, identifying, obtaining, quantifying, and/or otherwise determining the proximity of the image capture device to the receiver 14.

The proximity of the image capture device to the receiver 14/the system 10 may refer to quality or state of the image capture device being physically proximate/close to the receiver 14/the system 10. The proximity of the image capture device to the receiver 14/the system 10 may refer to the physical distance between the image capture device and the receiver 14/the system 10. For example, determining the proximity of the image capture device to the receiver 14 may include (1) determining the distance between the image capture device and the receiver 14/the system 10, (2) determining whether the image capture device is within a threshold distance of the receiver 14/the system 10, (3) determining whether the image capture device is within communication range of the receiver 14/the system 10, and/or (4) determining whether the image capture device is close enough to the receiver 14/the system 10 for the system 10 to facilitate change(s) in operation of the image capture device.

The proximity of the image capture device to the receiver 14 may be determined based on the transmission received from the image capture device and/or other information. The proximity of the image capture device to the receiver 14 may be determined based on whether or not the transmission from the image capture device is received by the receiver 14. For example, based on the transmission from the image capture device being received by the receiver 14, the image capture device may be determined to be physically proximate/close to the receiver 14/the system 10, within communication range of the receiver 14/the system 10, and/or otherwise close enough to the receiver 14/the system 10 for the system 10 to facilitate change(s) in operation of the image capture device. Based on the transmission from the image capture device not being received by the receiver 14, the image capture device may be determined to be not physically proximate/close to the receiver 14/the system 10, not within communication range of the receiver 14/the system 10, and/or otherwise not close enough to the receiver 14/the system 10 for the system 10 to facilitate change(s) in operation of the image capture device.

The proximity of the image capture device to the receiver 14 may be determined based on signal strength of the transmission received from the image capture device and/or other information. Signal strength of a transmission may refer to strength/magnitude of the transmission received by the receiver 14. Signal strength of a transmission may refer to measure of how strongly the transmission is being received by the receiver 14. Signal strength of a transmission may refer to quality, power, and/or value of the transmission that is received by the receiver 14. Higher signal strengths may correspond to closer distances between the image capture device and the receiver 14 while lower signal strengths may correspond to greater distances between the image capture device and the receiver 14. The values of the signal strength of the transmission received from the image capture device may be used to determine (1) the distance between the image capture device and the receiver 14/the system 10, (2) whether or not the distance between the image capture device and the receiver 14/the system 10 is within a threshold distance, (3) whether or not the image capture device is physically proximate/close to the receiver 14/the system 10, (4) whether or not the image capture device is within communication range of the receiver 14/the system 10, and/or otherwise determine whether the image capture device is close enough to the receiver 14/the system 10 for the system 10 to facilitate change(s) in operation of the image capture device. Other determination of the proximity of the image capture device to the receiver 14/the system 10 is contemplated.

The operation change component 104 may be configured to facilitate one or more changes in the operation of the image capture device. Facilitating a change in the operation of the image capture device may include assisting, automating, carrying out, controlling, enabling, implementing, initiating, performing, setting up, and/or otherwise facilitating the change in operation of the image capture device. The operation of the image capture device may refer to the functioning of the image capture device. The operation of the image capture device may refer to how the image capture device functions to perform one or more tasks, such as capturing content, encoding content, storing content, transferring content, and/or presenting content. A change in operation of the image capture device may include a change in how the image capture device functions.

The change(s) in the operation of the image capture device may be facilitated based on the proximity of the image capture device to the receiver 14 and/or other information. Whether or not the change(s) in the operation of the image capture device are facilitated may be determined based on the proximity of the image capture device to the receiver 14 and/or other information. In some implementations, the change(s) in the operation of the image capture device may be facilitated based on the proximity of the image capture device to the receiver satisfying (e.g., meeting, fulfilling) one or more proximity criteria and/or other information.

A proximity criteria may refer to one or more standards, factors, and/or principles by which the proximity of the image capture device to the receiver 14 is analyzed, judged, measured, and/or otherwise decided on for whether or not to facilitate change(s) in the operation of the image capture device. For example, a proximity criteria may determine whether change(s) in the operation of the image capture device should be facilitated based on information such as whether or not the distance between the image capture device and the receiver 14 is within a threshold distance, whether or not the image capture device is physically proximate/close to the receiver 14, and/or whether or not the image capture device is within communication range of the receiver 14/the system 10. For instance, based on the distance between the image capture device and the receiver 14 being within the threshold distance, the image capture device being physically proximate/close to the receiver 14, and/or the image capture device being within communication range of the receiver 14/the system 10, the change(s) in the operation of the image capture device may be facilitated. Based on the distance between the image capture device and the receiver 14 being outside the threshold distance, the image capture device being physically far from the receiver 14, and/or the image capture device being outside communication range of the receiver 14/the system 10, the change(s) in the operation of the image capture device may not be facilitated.

As another example, a proximity criteria may determine whether change(s) in the operation of the image capture device should be facilitated based on information such as whether or not the transmission from the image capture device is received by the receiver 14 and/or the signal strength of the transmission received from the image capture device. For instance, based on the transmission from the image capture device being received by the receiver 14 and/or the signal strength of the transmission received from the image capture device being higher than a threshold signal strength, the operation of the image capture device may be facilitated. Based on the transmission from the image capture device not being received by the receiver 14 and/or the signal strength of the transmission received from the image capture device being lower than a threshold signal strength, the operation of the image capture device may not be facilitated.

A change in operation of an image capture device may include a change in one or more aspects of operation of the image capture device. One or more aspects of operation of the image capture device may include one or more aspects of operation of a processor of the image capture device, an image sensor of the image capture device(s), an optical element of the image capture device(s), and/or other aspects of operation of the image capture device(s).

For example, one or more aspects of operation of an image capture device may include single image capture, burst image capture, video capture, slow motion video capture, time lapse capture, night lapse capture, capture resolution, capture framerate, capture field of view, zoom, image projection, image color balance, tonal curve, exposure compensation, color saturation, contrast, sharpening, softening, gamma, ISO limit, video stabilization, horizon leveling, shutter speed, encoding parameters (e.g., codec type (H.264, HEVC), I-frame interval, macroblock size, deblocking filter, QP, capture timing (e.g., auto, interval, continuous, loop), time, location, and/or other aspects of operation of the image capture device.

In some implementations, one or more aspects of operation of an image capture device may include aspects of operation of one or more microphone/sound sensors of the image capture device. For example, one or more aspects of operation of an image capture device may include number of channels, sample rate, compression format (e.g., AAC, MP3), averaging/filter window duration, and/or other aspects of operation of the microphone(s)/sound sensor(s). Other aspects of operation of an image capture device are contemplated.

In some implementations, the change(s) in the operation of the image capture device may include one or more change in one or more capture settings of the image capture device. A capture setting may refer a capture parameter that may be turned on, turned off, set to a particular value, and/or otherwise modifiable to change how the image capture device functions. For example, the change(s) in the operation of the image capture device may include turning on/off one or more capture parameters and/or changing values of one or more capture parameters.

In some implementations, the change(s) in the operation of the image capture device may include one or more change in a capture mode of the image capture device. A capture mode may refer to a pre-defined mode of operation for an image capture device. For example, the change(s) in the operation of the image capture device may include switching between different capture modes in which the image capture device may operate.

In some implementations, the change(s) in the operation of the image capture device may be determined based on user input and/or other information. Which aspect(s) of the operation of the image capture device are changed and/or how those aspect(s) are changed may have been previously set by a user. For example, the user may have defined certain capture settings and/or capture modes (e.g., favorite capture settings/modes, saved capture settings/modes), and the operation of the image capture device may be changed to use these capture settings and/or capture modes.

In some implementations, the change(s) in the operation of the image capture device may be determined based on time, location, activity, and/or other information. Which aspect(s) of the operation of the image capture device are changed and/or how those aspect(s) are changed may be determined based on the current of time of the image capture device and/or the system 10, based on current location (e.g., GPS location, environment type such as underwater, beach, desert, park, mountain, city) of the image capture device and/or the system 10, based on current activity engaged with the image capture device and/or the system 10, and/or other information. For example, different times, locations, and/or activities (and/or different combination of times, locations, and/or activities) may be associated with different capture settings and/or capture modes, and the operation of the image capture device may be changed to use the capture settings and/or capture modes associated with the current time, location, and/or activity (and/or combination of current time, location, and/or activity) of the image capture device and/or the system 10.

In some implementations, facilitating the change(s) in the operation of the image capture device may include generating one or more machine-readable optical codes that convey one or more aspects of the operation of the image capture device and presenting the machine-readable optical code(s) on the electronic display 15. The machine-readable optical code(s) may be generated based on one or more aspects of the operation of the image capture device. The machine-readable optical code(s) may be generated to convey one or more aspects of the operation of the image capture device.

The machine-readable optical code(s) may convey the aspect(s) of the operation of a particular image capture device. The machine-readable optical code(s) may convey the aspect(s) of the operation of multiple image capture devices. The machine-readable optical code(s) may convey the aspect(s) of the operation of a particular type of image capture device. The machine-readable optical code(s) may convey the aspect(s) of the operation of multiple types of image capture device. The machine-readable optical code(s) may convey the same aspect(s) of the operation of multiple image capture devices/multiple types of image capture device. The machine-readable optical code(s) may convey different aspects of the operation of different image capture devices/different types of image capture device.

A machine-readable optical code may include a visual representation of data. The visual representation of data may be readable by the image capture device based on capture of an image/video including the machine-readable optical code. A machine-readable optical code may encode the data visually by varying the size and shape of patterns within the machine-readable optical code. The data may be encoded within a machine-readable optical code using one or more encoding modes.

In some implementations, a machine-readable optical code may include a one-dimensional machine-readable optical code (e.g., continuous or discrete barcodes), a two-dimensional machine-readable optical code (e.g., QR code), and/or a three-dimensional machine-readable optical code (e.g., holograms). In some implementations, a machine-readable optical code may include one or more varying components (e.g., a barcode/QR code/hologram that changes with time/location). Other dimensions and types of machine-readable optical codes are contemplated.

The presentation of the machine-readable optical code(s) on the electronic display 15 may enable the image capture device to capture an image including the machine-readable optical code(s), determine the aspect(s) of operation conveyed by the machine-readable optical code(s), and operate in accordance with the aspect(s) of operation conveyed by the machine-readable optical code. Rather having to manually change the operation of the image capture device, a user of the image capture device may bring the image capture device near the system 10 and then scan the machine-readable optical code(s) presented by the system 10.

In some implementations, the electronic display 15 may be part of a mobile device. The machine-readable optical code(s) may be presented within one or more applications running on the mobile device. For example, an application for the image capture device may be installed on the mobile device, and the application may be opened to present the machine-readable optical code(s). As another example, the machine-readable optical code(s) may be presented within one or more widgets of the mobile device.

In some implementations, the status of the mobile device may be changed to present the machine-readable optical code(s). For example, the mobile device may be locked, and the mobile device may be automatically unlocked to present the machine-readable optical code(s). In some implementations, the status of the mobile device may not be changed to present the machine-readable optical code(s). For example, the mobile device may be locked, and the machine-readable optical code(s) may be presented on a lock screen of the mobile device without unlocking the mobile device.

Figure 4A:
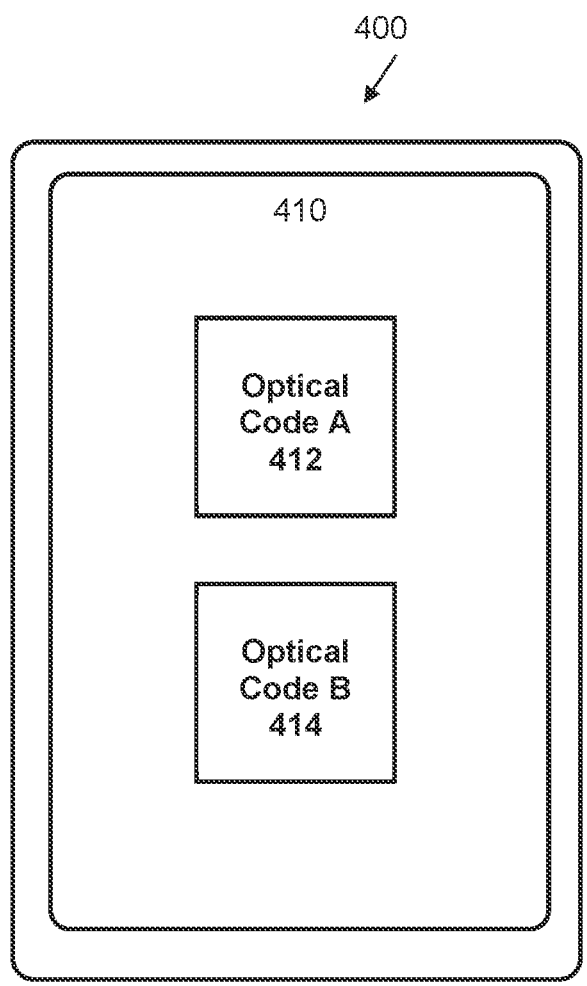
FIG. 4A illustrates an example presentation of optical codes for changing image capture device operation.
Figure 4B:
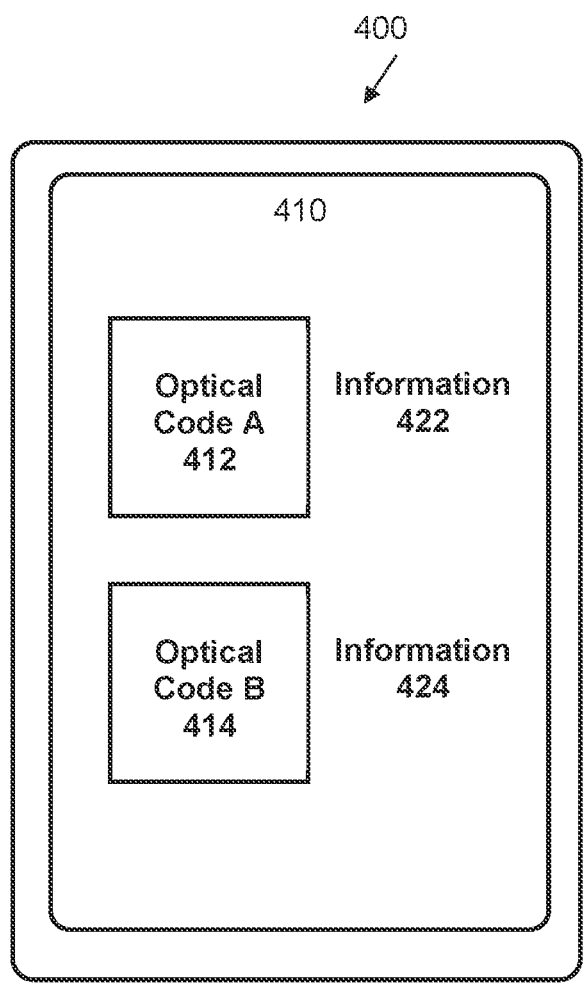
FIG. 4B illustrates an example presentation of optical codes for changing image capture device operation.

FIGS. 4A and 4B illustrate example presentation of optical codes for changing image capture device operation. A mobile device 400 may include an electronic display 410. An optical code A 412 and an optical code B 414 may be presented on the electronic display. Other numbers of optical codes may be presented on the electronic display 412. The optical code A 412 and the optical code B 414 may convey different aspects of operation of an image capture device. The image capture device may capture an image or a video including one or both of the optical codes 412, 414 to operate in accordance with the aspects of operation conveyed by the optical codes 412, 414.

The machine-readable optical code(s) may be presented with other information. For example, referring to FIG. 4B, the optical codes 412, 414 may be presented with information 422 and information 424. The information 422 may provide information relating to the optical code 412 and the information 424 may provide information relating to the optical code 424, such as name of the capture settings/mode being conveyed by the optical codes 412, 414, summary/details of the aspects of operation conveyed by the optical codes 412, 414 (e.g., capture parameter being changed, values of capture parameters), and/or other information relating to the optical codes 412, 414. Presentation of such information may assist the user in figuring out which optical codes will be used to change the operation of the image capture device.

In some implementations, facilitating the change(s) in the operation of the image capture device may include generating one or more signal(s) and transmitting, via the transmitter 16, the signal(s) to the image capture device. The signal(s) may convey one or more aspects of the operation of the image capture device. The transmission of the signal(s) to the image capture device may enable the image capture device to receive the signal, determine the aspect(s) of operation conveyed by the signal, and operate in accordance with the aspect(s) of operation conveyed by the signal. In some implementations, the signal(s) may include one or more Bluetooth Low Energy signals.

The signal(s) may convey the aspect(s) of the operation of a particular image capture device. The signal(s) may convey the aspect(s) of the operation of multiple image capture devices. The signal(s) may convey the aspect(s) of the operation of a particular type of image capture device. The signal(s) may convey the aspect(s) of the operation of multiple types of image capture device. The signal(s) may convey the same aspect(s) of the operation of multiple image capture devices/multiple types of image capture device. The signal(s) may convey different aspects of the operation of different image capture devices/different types of image capture device.

The transmission of the signal(s) by the transmitter 16 may enable the image capture device to change its operation by being near (e.g., being within communication range) the transmitter 16. Rather having to manually change the operation of the image capture device, a user of the image capture device may bring the image capture device near the system 10 and have the image capture device change its operation based on wireless communication with eh system 10.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although the processor 11, the electronic storage 13, the receiver 14, the electronic display 15, and the transmitter 16 are shown to be connected to the interface 12 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of electronic storage 13 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within system 10, or the electronic storage 13 may be provided integrally with one or more other components of system 10 (e.g., processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
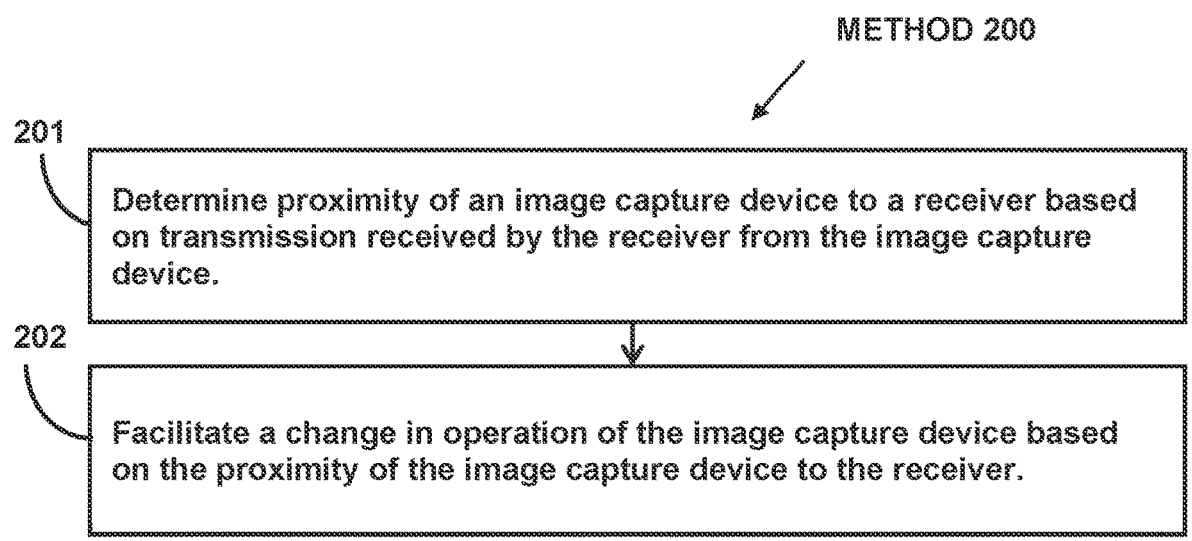
FIG. 2 illustrates a method for changing image capture device operation.

FIG. 2 illustrates method 200 for identifying media items for sharing. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, proximity of the image capture device to the receiver may be determined based on the transmission received from the image capture device. In some implementations, operation 201 may be performed by a processor component the same as or similar to the proximity component 102 (Shown in FIG. 1 and described herein).

At operation 202, a change in operation of the image capture device may be facilitated based on the proximity of the image capture device to the receiver. In some implementations, operation 202 may be performed by a processor component the same as or similar to the operation change component 104 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A mobile device for changing image capture device operation, the mobile device comprising:
   an electronic display:
   a receiver configured to receive transmission from an image capture device, the transmission from the image capture device including information on identity and/or identifier of the image capture device; and
   one or more physical processors configured by machine-readable instructions to:
      determine whether a distance between the image capture device and the mobile device satisfies a distance criterion based on the transmission received from the image capture device, wherein the distance criterion is satisfied based on the transmission from the image capture device being received by the receiver or signal strength of the transmission received from the image capture device being greater than a threshold signal strength; and
      responsive to determination that the distance between the image capture device and the mobile device satisfies the distance criterion, generate a machine-readable optical code conveying one or more aspects of operation of the image capture device and present the machine-readable optical code on the electronic display, the one or more aspects of the operation of the image capture device including a capture setting or a capture mode of the image capture device, wherein the image capture device is configured to capture an image including the machine-readable optical code, determine the one or more aspects of the operation conveyed by the machine-readable optical code, and operate in accordance with the one or more aspects of the operation conveyed by the machine-readable optical code.

2. The mobile device of claim 1, wherein responsive to the mobile device being locked, the mobile device is automatically unlocked to present the machine-readable optical code on the electronic display or the machine-readable optical code is presented on a lockscreen of the mobile device without unlocking the mobile device.

3. A mobile device for changing image capture device operation, the mobile device comprising:
   an electronic display;
   a receiver configured to receive transmission from an image capture device, the transmission from the image capture device including information on identity and/or identifier of the image capture device; and
   one or more physical processors configured by machine-readable instructions to:
      determine whether a distance between the image capture device and the mobile device satisfies a distance criterion based on the transmission received from the image capture device; and
      responsive to determination that the distance between the image capture device and the mobile device satisfies the distance criterion, generate a machine-readable optical code conveying one or more aspects of operation of the image capture device and present the machine-readable optical code on the electronic display, wherein the image capture device is configured to capture an image including the machine-readable optical code, determine the one or more aspects of the operation conveyed by the machine-readable optical code, and operate in accordance with the one or more aspects of the operation conveyed by the machine-readable optical code.

4. The mobile device of claim 3, wherein responsive to the mobile device being locked, the mobile device is automatically unlocked to present the machine-readable optical code on the electronic display.

5. The mobile device of claim 3, wherein responsive to the mobile device being locked, the machine-readable optical code is presented on a lockscreen of the mobile device without unlocking the mobile device.

6. The mobile device of claim 3, further comprising a transmitter, wherein the one or more physical processors are, responsive to the determination that the distance between the image capture device and the mobile device satisfies the distance criterion, further configured by the machine-readable instruction to:
   generate a signal, the signal conveying the one or more aspects of the operation of the image capture device; and
   transmit, via the transmitter, the signal to the image capture device, wherein the image capture device is configured to receive the signal, determine the one or more aspects of the operation conveyed by the signal, and operate in accordance with the one or more aspects of the operation conveyed by the signal.

7. The mobile device of claim 6, wherein the signal includes a Bluetooth Low Energy signal.

8. The mobile device of claim 3, wherein the one or more aspects of the operation of the image capture device includes a capture setting or a capture mode of the image capture device.

9. The mobile device of claim 3, wherein the determination whether the distance between the image capture device and the mobile device satisfies the distance criterion based on the transmission received from the image capture device includes determination of the distance criterion being satisfied based on the transmission from the image capture device being received by the receiver.

10. The mobile device of claim 3, wherein the one or more aspects of the operation of the image capture device are determined based on time, location, and/or activity of the mobile device or the image capture device.

11. The system mobile device of claim 3, wherein the determination whether the distance between the image capture device and the mobile device satisfies the distance criterion based on the transmission received from the image capture device includes determination of the distance criterion being satisfied based on signal strength of the transmission received from the image capture device being greater than a threshold signal strength.

12. A method for changing image capture device operation, the method performed by a mobile device comprising an electronic display, a receiver, and one or more processors, the method comprising:
   receiving, by the receiver, transmission from an image capture device, the transmission from the image capture device including information on identity and/or identifier of the image capture device;
   determining, by the one or more processors, whether a distance between the image capture device and the mobile device satisfies a distance criterion based on the transmission received from the image capture device; and
   responsive to determining that the distance between the image capture device and the mobile device satisfies the distance criterion, generating a machine-readable optical code conveying one or more aspects of operation of the image capture device and presenting the machine-readable optical code on the electronic display, wherein the image capture device is configured to capture an image including the machine-readable optical code, determine the one or more aspects of the operation conveyed by the machine-readable optical code, and operate in accordance with the one or more aspects of the operation conveyed by the machine-readable optical code.

13. The method of claim 12, wherein responsive to the mobile device being locked, the mobile device is automatically unlocked to present the machine-readable optical code on the electronic display.

14. The method of claim 12, wherein responsive to the mobile device being locked, the machine-readable optical code is presented on a lockscreen of the mobile device without unlocking the mobile device.

15. The method of claim 12, wherein:
   the mobile device further comprises a transmitter; and
   the method further comprising, responsive to determining that the distance between the image capture device and the mobile device satisfies the distance criterion,
      generating a signal, the signal conveying the one or more aspects of the operation of the image capture device; and
      transmitting, via the transmitter, the signal to the image capture device, wherein the image capture device is configured to receive the signal, determine the one or more aspects of the operation conveyed by the signal, and operate in accordance with the one or more aspects of the operation conveyed by the signal.

16. The method of claim 15, wherein the signal includes a Bluetooth Low Energy signal.

17. The method of claim 12, wherein the one or more aspects of the operation of the image capture device includes a capture setting or a capture mode of the image capture device.

18. The method of claim 12, wherein determining whether the distance between the image capture device and the mobile device satisfies the distance criterion based on the transmission received from the image capture device includes determining the distance criterion being satisfied based on the transmission from the image capture device being received by the receiver.

19. The method of claim 12, wherein the one or more aspects of the operation of the image capture device are determined based on time, location, and/or activity of the mobile device or the image capture device.

20. The method of claim 12, wherein determining whether the distance between the image capture device and the mobile device satisfies the distance criterion based on the transmission received from the image capture device includes determining the distance criterion being satisfied based on signal strength of the transmission received from the image capture device being greater than a threshold signal strength.

* * * * *